Aug. 13, 1940.    G. SOLKOVER    2,211,353
ILLUSION DEVICE
Filed April 18, 1939    2 Sheets-Sheet 1

INVENTOR.
George Solkover
BY
Edward E. Barrett
ATTORNEYS.

Aug. 13, 1940.  G. SOLKOVER  2,211,353
ILLUSION DEVICE
Filed April 18, 1939  2 Sheets-Sheet 2

INVENTOR.
George Solkover
BY
ATTORNEYS.

Patented Aug. 13, 1940

2,211,353

UNITED STATES PATENT OFFICE 2,211,353

ILLUSION DEVICE

George Solkover, Seattle, Wash.

Application April 18, 1939, Serial No. 268,555

7 Claims. (Cl. 272—13)

This invention relates to improvements in illusion devices and for its general object is directed to the provision of such a device, somewhat dioramic in character and somewhat in the nature of a cyclorama, which will simulate quiet bodies of water with the inherent reflective effects of a mountainous or other scenic background. It is, more especially, an object of my invention, by or with the conjunctive employment of physical reproductions of a natural background, either in relief or otherwise, reverse replicas thereof, and a plate or plates of glass, to produce illusionary effects in which the suggestion of reflection is paramount and which is created in an amazingly beautiful and unusually realistic manner.

The invention, with the foregoing and further objects and advantages in view, the nature of which will appear in the course of the following description and claims, consists in the novel construction and in the adaptation and combination of parts hereinafter described and claimed.

Figure 2:
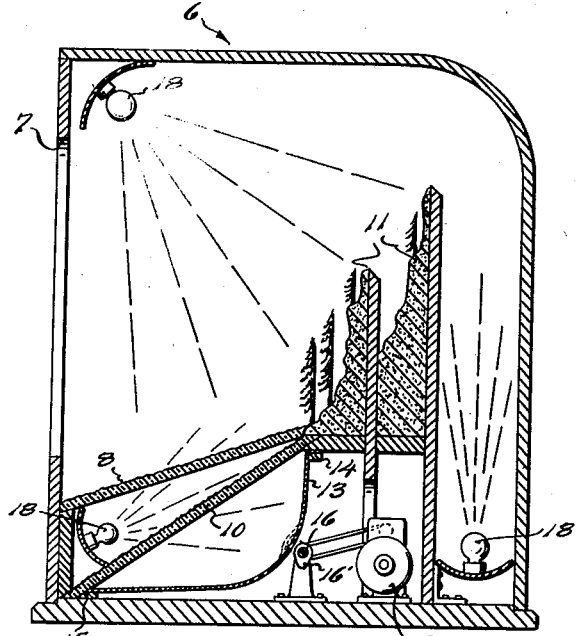
Fig. 2 is a cross-section thereof.
Figure 4:
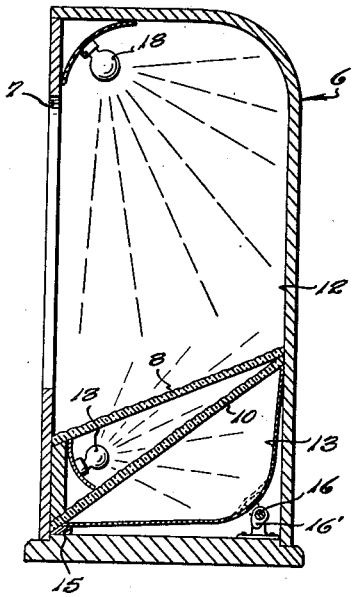
Fig. 4 is a cross-section of the illusion device shown in Fig. 3.
Figure 5:
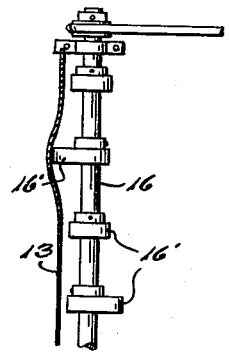
Fig. 5 is a fragmentary horizontal section taken through the flexible curtain from which the reflective effect originates and detailing a means by which, for advancing the realistic effect of water, the curtain is given a slight undulatory movement.

According to my invention I provide, within a suitable cabinet 6 having a viewing aperture 7 in its forward wall, a rectangular plate of transparent glass 8 roughened on its upper surface and supported in an inclined plane sloping upwardly from front to rear, this plate being complemented, preferably, by one or more additional plates, as 10, similarly roughened and likewise sloped from the horizontal but to successively greater angularities, each from the plate next above. The roughening of the plates, wave-like in character, is very slight and it may be here stated that the illustration thereof represented in Figs. 2 and 4 is greatly exaggerated. It will of course be apparent that the effect of a roughened surface might be obtained by applying a transparent plastic wash over the glass plates as well as by producing the low-relief formations as an integral part of the glass.

Figure 1:
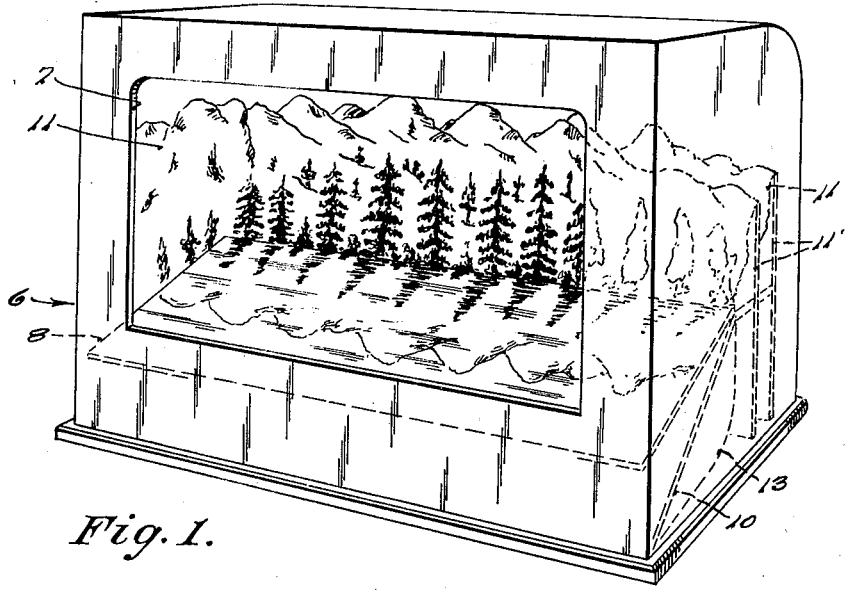
Figure 1 is a perspective view representing one embodiment of the present invention having a background formed in relief.
Figure 3:
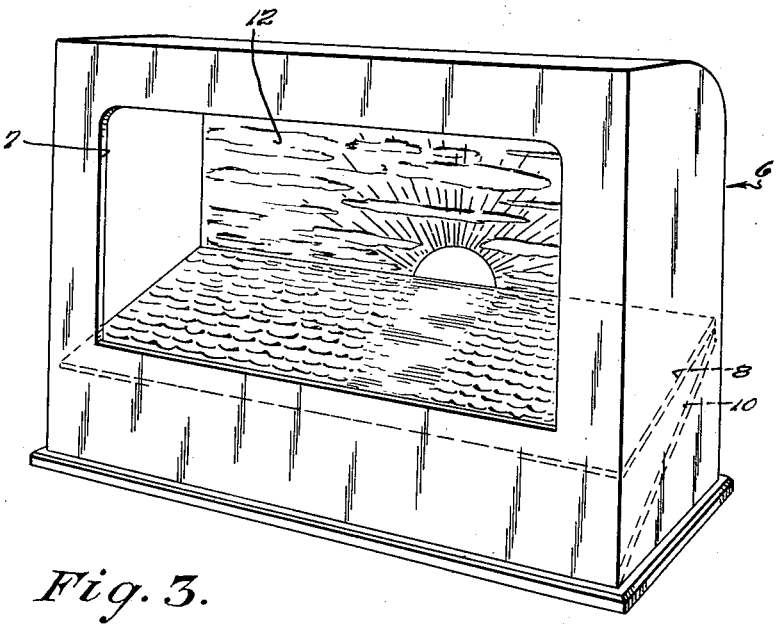
Fig. 3 is a perspective view representing another embodiment of the invention in which the background is a painted surface.

The plates are cemented or otherwise held in contact along their rear edges, and rising vertically therefrom I provide the desired background, portrayed either by modeling trees, mountains and the like in high relief, represented at 11 in Figs. 1 and 2, or by painting the selected scene on a suitable surface such as the rear wall 12 of the cabinet, represented in Figs. 3 and 4.

Subjacent to the rear limits of the plates is a pendant curtain 13, preferably canvas, hung from a cleat 14 and curving toward the front of the cabinet whereat the same is fixed by a cleat 15 located at or adjacent the forward limits of the lower plate 10. Viewed through the glass plates, the surface of this canvas curtain operates to provide the reflective effect characteristic of the invention, to which end the surface is painted to give a reverse replica of the background portrayed above the plates. It is preferable, for maximum realism, that a slight undulatory movement be imparted to the curtain and I illustrate, as an example of means therefor, a cam shaft 16 driven by a motor 17 and disposed to have the cams 16' alternately engage the rear surface of the canvas. Wearing strips (not shown) may be employed to prevent direct rub as between the cams and the curtain.

Suitable illumination for the device is obtained from electrically energized lamps 18 located in the positions shown or as might be otherwise desired to effectively light the land and water units and outline the mountains modeled on the flats 11'.

It is not my intention to imply any limitations from the foregoing description or the illustration to which the same refers excepting as restrictive language equivalent thereto is necessarily employed in the hereto annexed claims to distinguish from the prior state of the art.

What I claim is:

1. In an illusion device, the combination of a scenic background occupying a substantial perpendicular plane, plural divergingly disposed plates of transparent glass extending forwardly from the lower limits of the background in inclined planes defining obtuse angles in relation to the general plane of the background, said plates having their upper surfaces slightly roughened, a pendant curtain of a flexible material located below the plates and provided on its visible surface with a reverse replica of the background, and means operatively associated with the curtain for causing undulatory movement of the pseudo-reflection portrayed thereon.

2. In an illusion device, the combination of a scenic background facing the spectator, a plate of transparent glass having its upper surface slightly roughened and extending forwardly from the lower limits of the background in a sloping plane inclined from the spectator's line of vision to the background, a pendant curtain of a flexible material extending between the front and rear limits of the plate below the latter and provided on its visible surface with a reverse replica of the background, and means operatively associated with the curtain for causing undulatory movement of the pseudo-reflection portrayed thereon.

3. In an illusion device, the combination of a scenic background facing the spectator, a plate of translucent glass extending forwardly from the lower limits of the background to simulate a body of water, and a pendant curtain subjacent to the rear limits of the glass plate provided on its visible surface with a reverse replica of the background to produce a pseudo-reflection of the latter when viewed through the plate.

4. In an illusion device, the combination of a scenic background, a plate of transparent glass having a slightly roughened surface and extending forwardly from the lower limits of the background to simulate a body of water, and means subjacent to the rear limits of the plate portraying a reverse replica of the background for producing a pseudo-reflection of the latter when viewed through the plate.

5. In an illusion device, the combination of a scenic background facing the spectator, a plate of translucent glass extending forwardly from the lower limits of the background to simulate a body of water, a pendant curtain subjacent to the rear limits of the glass plate provided on its visible surface with a reverse replica of the background to produce a pseudo-reflection of the latter when viewed through the plate, and means operatively associated with the curtain for causing undulatory movement of the pseudo-reflection portrayed thereon.

6. In an illusion device, the combination of a scenic background, a plate of transparent glass having a slightly roughened surface and extending forwardly from the lower limits of the background to simulate a body of water, means subjacent to the rear limits of the plate portraying a reverse replica of the background for producing a pseudo-reflection of the latter when viewed through the plate, and means operatively associated with said subjacent means functioning to animate the pseudo-reflection provided thereby.

7. In an illusion device, the combination of a scenic background, a plate of semi-transparent material extending forwardly from the lower limits of the background and by its appearance simulating a body of water, and means subjacent to the semi-transparent plate portraying a reverse replica of the background for producing a pseudo-reflection of the latter when viewed through the plate.

GEORGE SOLKOVER.